(12) United States Patent
Gautier et al.

(10) Patent No.: US 6,324,844 B1
(45) Date of Patent: *Dec. 4, 2001

(54) HYDRO-MECHANICAL FORCE-TRANSMISSION DEVICE

(75) Inventors: Jean-Pierre Gautier, Aulnay-Ss-Bois; Cedric Leboisne, Paris, both of (FR)

(73) Assignee: Robert Bosch GmbH, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/269,159

(22) PCT Filed: Feb. 22, 1999

(86) PCT No.: PCT/FR99/00392

§ 371 Date: Mar. 16, 1999

§ 102(e) Date: Mar. 16, 1999

(87) PCT Pub. No.: WO99/43522

PCT Pub. Date: Sep. 2, 1999

(30) Foreign Application Priority Data

Feb. 27, 1998 (FR) .................................. 98 02377

(51) Int. Cl.$^7$ ........................................ F15B 7/00
(52) U.S. Cl. ............................................ 60/533
(58) Field of Search ........................ 60/533, 547.1, 60/579, 583

(56) References Cited

U.S. PATENT DOCUMENTS 3,974,901 * 8/1976 Cervinka et al. ................. 60/533 X
4,372,118 * 2/1983 Andresen ........................... 60/533 X
4,551,976 * 11/1985 Nix et al. .............................. 60/533
4,581,979 * 4/1986 Compton et al. ................. 60/533 X
4,766,804 * 8/1988 Barker ................................ 60/533 X
4,819,996 * 4/1989 Belart et al. ..................... 60/547.1 X
4,959,960 * 10/1990 LaFountain ........................... 60/533
5,090,201 * 2/1992 Smith ................................. 60/533 X
5,150,575 * 9/1992 Parker ................................ 60/547.1
5,182,911 * 2/1993 Shellhause ............................. 60/533
5,289,682 * 3/1994 Gill et al. ........................... 60/547.1
5,331,813 * 7/1994 Heibel et al. ........................ 60/547.1
5,533,336 * 7/1996 Kiat et al. .............................. 60/533
5,934,432 * 8/1999 Bates ................................. 60/533 X

FOREIGN PATENT DOCUMENTS

1220094 * 12/1958 (FR) ...................................... 60/583
53-113973 * 10/1978 (JP) ...................................... 60/583
5-193903 * 11/1983 (JP) ...................................... 60/583

* cited by examiner

*Primary Examiner*—John E. Ryznic
(74) *Attorney, Agent, or Firm*—Leo H. McCormick, Jr.; Warren Comstock

(57) ABSTRACT

A force transmission and amplification device for a brake system comprising a pedal (1) and an output rod (2) for transmitting by way of the output rod (2) an output force (F2) having a higher intensity than an input force (F1) applied to pedal (1). An input rod (3) is secured to the pedal (1) for supplying a primary piston (4) located in a first diameter (D1) of primary cylinder (5) to delimit a primary chamber (51) retaining a fluid. A second piston (6) secured to the output rod (2) is located in a second diameter (D2) of a second cylinder (7) to delimit a secondary chamber (71). The primary chamber (51) is connected to the secondary chamber (71) to immediately supply pressurized fluid which acts on the second piston (6) to develop the output force (F2).

1 Claim, 2 Drawing Sheets

HYDRO-MECHANICAL FORCE-TRANSMISSION DEVICE

The present invention relates to a force transmission and amplification device, especially for a brake or clutch system, comprising a pedal and an output rod and capable of transmitting via its output rod, in response to an input force of a first intensity exerted on the pedal, an output force of a second intensity higher than the first.

BACKGROUND OF THE INVENTION

Devices of this type are well known in the prior art, and an example of them is given in Patent document FR-2,278,964.

From other sources, other brake- or clutch-system actuating devices are known, which are designed to convert the mechanical energy involved in actuating a pedal directly into hydraulic energy in the form of an increase in pressure of a hydraulic fluid. Examples of such devices are given, in particular, in Patents EP-0,293,082 and DE-3,932,529.

All the known systems do, however, have the common defect of leading to relatively high amounts of dead travel.

SUMMARY OF THE INVENTION

The invention falls within this context and its object is to provide a force transmission and amplification device for a brake system, which has a shorter dead travel.

To this end, the device of the invention, which corresponds to the generic definition in the above preamble, is essentially characterized in that it further comprises: an input rod, a first end of which is secured to the pedal; a primary piston secured to a second end of the input rod; a primary cylinder of a first diameter in which the primary piston slides in leaktight fashion therein delimiting a primary chamber of variable volume filled with a hydraulic fluid; a secondary piston to which the output rod is secured; and a secondary cylinder of a second diameter greater than the first, in which the secondary piston slides in leaktight fashion therein delimiting a second chamber of variable volume communicating with the primary chamber.

The primary cylinder and secondary cylinder are preferably secured to one another and possibly have respective axes of symmetry that form between them an angle smaller than a flat angle.

Other features and advantages of the invention will emerge clearly from the description thereof given hereafter by way of non-limiting indication, with reference to the drawings:

DETAILED DESCRIPTION OF THE INVENTION

Figure 1:
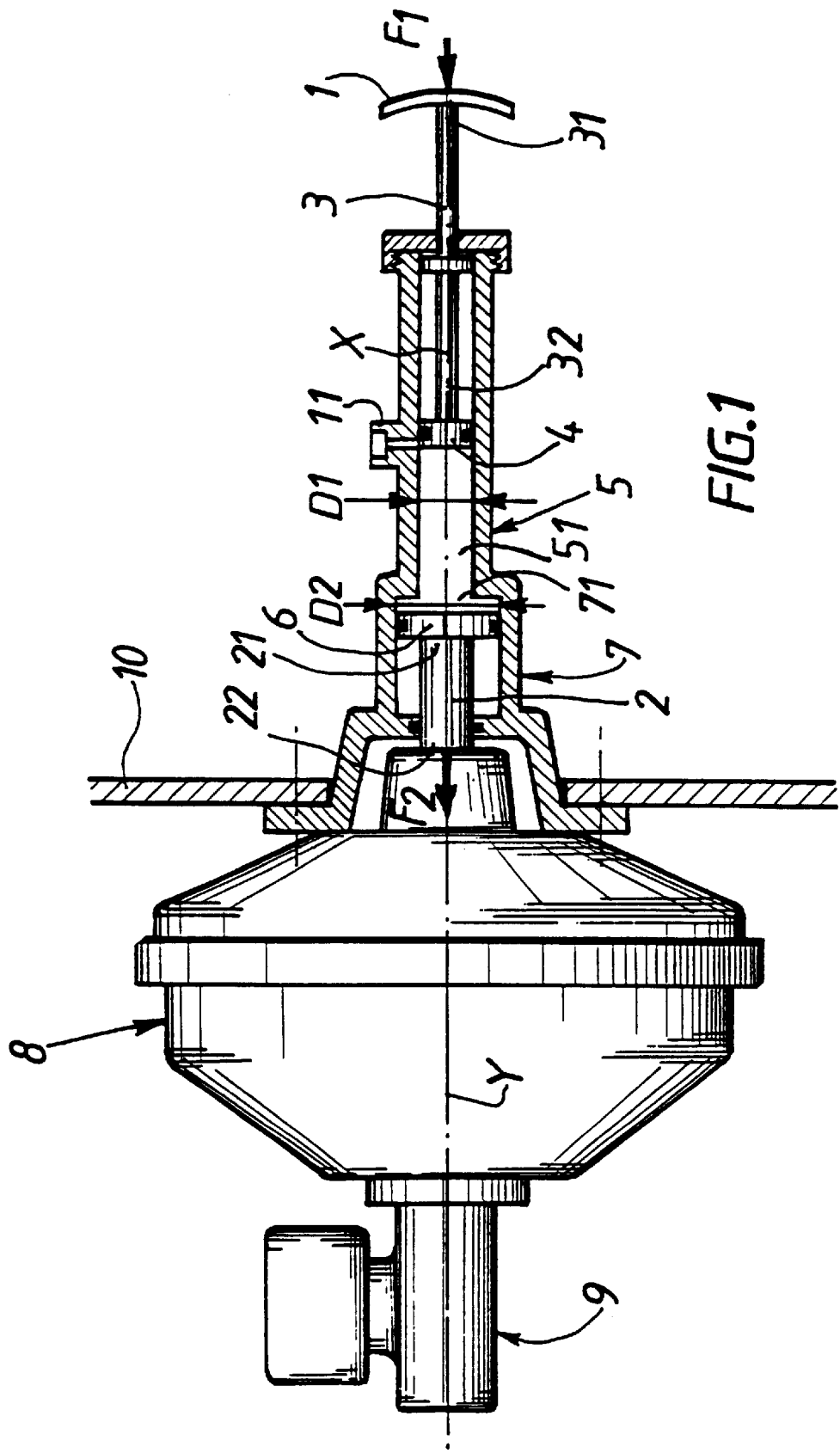
FIG. 1 is a diagrammatic sectional view of a device in accordance with a first possible embodiment of the invention.

The invention relates to a force transmission and amplification device, essentially depicted in the figures in the form of components identified by the references 1 to 7, this device making it possible to actuate a brake system, and more particularly, a system comprising a pneumatic brake booster 8 coupled with a master cylinder 9 and mounted on the bulk head 10 of a motor vehicle.

The device of the invention, which comprises as is known per se, a pedal 1 and an output rod 2, is designed to transmit to the brake system 8, 9, via its output rod 2, an output force F2 when an input force F1 is exerted on the pedal 1, the output force F2 being of higher intensity than the input force F1.

According to the invention, this device mainly comprises, in addition to the pedal 1 and the output rod 2, an input rod 3, a primary piston 4, a primary cylinder 5, a secondary piston 6 and a secondary cylinder 7.

A first end 31 of the input rod 3 is secured to the pedal 1, while the other end 32 of this input rod 3 is secured to the primary piston 4.

The primary piston 4 slides in leaktight fashion in the primary cylinder 5, which has an inside diameter D1, the primary piston 4 thus delimiting, within the primary cylinder 5, a primary chamber 51 of variable volume which is filled with a hydraulic fluid.

The output rod 2 has a first end 21 to which the secondary piston 6 is attached, and a secondary end 22 via which the output force F2 is applied to the brake system 8, 9.

The secondary piston 6 slides in leaktight fashion in the secondary cylinder 7, which has an inside diameter D2 larger than the diameter D1 of the primary cylinder 5, the secondary piston 6 thus delimiting, within the secondary cylinder 7, a secondary chamber 71 of variable volume communicating with the primary chamber 51.

By virtue of this arrangement, the ratio (F2/F1) of the output force to the input force is equal to the ratio $(D2/D1)^2$, that is to say to the square of the ratio (D2/D1) of the diameter of the secondary cylinder 7 to the diameter of the primary cylinder 5.

Figure 2:
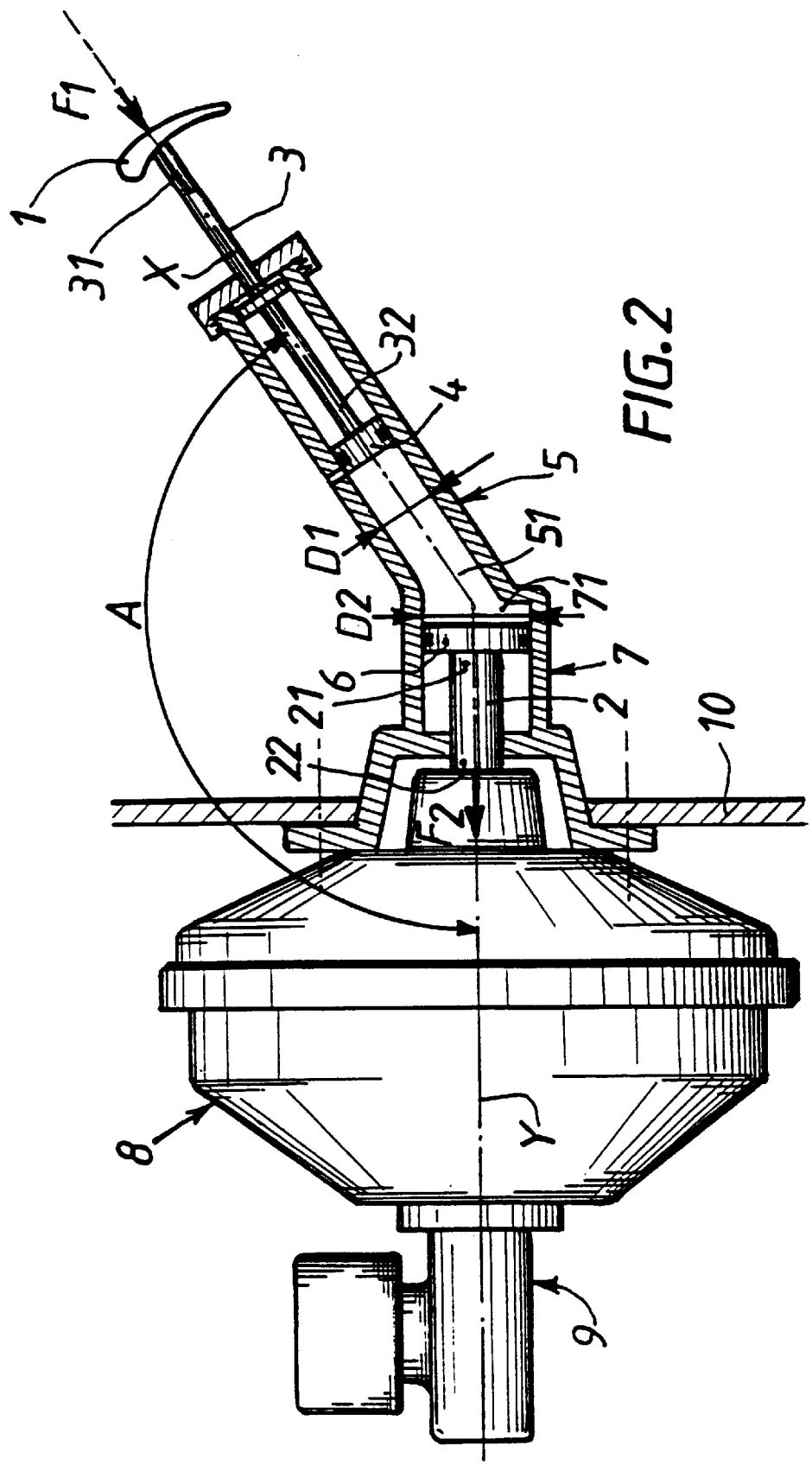
FIG. 2 is a diagrammatic sectional view of a device in accordance with a second possible embodiment of the invention.

It is possible, as shown in FIG. 1, to contrive for the primary chamber 51 to comprise an orifice 11 for refilling with hydraulic fluid, connected to a reservoir, or, on the contrary, for this primary chamber to operate in a closed circuit, as shown in FIG. 2.

In any event, it is advantageous for the primary cylinder 5 and secondary cylinder 7 to be secured to one another, the device of the invention then forming a rigid assembly capable of replacing a conventional pedal box.

The primary cylinder 5 and secondary cylinder 7 may furthermore be arranged with respect to each other, as shown in FIG. 2, in such a way that their respective axes of symmetry X, Y form between them an angle A smaller than a flat angle.

The device of the invention has a shorter dead travel than is exhibited by known devices, in which the use of one or more mechanical levers has, of necessity, to result in the amplification of play of all kinds.

What is claimed is:

1. A force transmission and amplification device for supplying an input force to activate a brake system, said device comprising:

a pedal pad; and transmitting means connected to said pedal pad and acting in response to an first input force of a first intensity exerted on said pedal pad for developing an output force of a second intensity higher than said first intensity for supplying a second input force to operate said brake system, said transmitting means being characterised by a housing having a stepped bore therein with a first diameter and a second diameter, said second diameter being larger than said first diameter, an input rod having a first end fixed to said pedal pad and a second end secured to a primary piston, said primary piston being located in said first diameter to define a first chamber having a first axis of symmetry within said stepped bore, said first chamber having a first variable volume filled with hydraulic fluid; an output rod having a first end connected to said brake system and a second end secured to a secondary piston, said secondary piston being located in said second diameter to define a second chamber having a second axis of symmetry within said stepped bore, said second chamber having a second variable volume filled with hydraulic fluid, said first and second axis of symmetry intersecting to form an angle smaller than a flat angle such that the primary piston slides in said first axis of symmetry of the primary chamber and said secondary piston slides in said second axis of symmetry of said secondary chamber in a leaktight fashion in response to an input force applied to said pedal pad causing said secondary piston to move within said secondary chamber without dead travel to immediately initiate operation of said brake system as a function of said second input force.

* * * * *